United States Patent [19]

Tobise et al.

[11] Patent Number: 5,256,944
[45] Date of Patent: Oct. 26, 1993

[54] MOTOR SPEED CONTROL METHOD AND APPARATUS WITH DROOPING COMPENSATION INDEPENDENT OF ACCELERATION OR DECELERATION CURRENT AND TIME CONSTANT OF MOTOR

[75] Inventors: Masahiro Tobise; Itsuo Shimizu, both of Katsuta; Yuji Yamasawa, Hitachiota; Toshihiko Chino, Chiba, all of Japan

[73] Assignees: Hitachi, Ltd., Tokyo; Kawasaki Steel Corporation, Kobe, both of Japan

[21] Appl. No.: 757,049

[22] Filed: Sep. 9, 1991

[30] Foreign Application Priority Data

Sep. 7, 1990 [JP] Japan ............................... 02-235523

[51] Int. Cl.$^5$ ............................................. H02F 7/00
[52] U.S. Cl. ........................................ 318/799; 318/7
[58] Field of Search ............... 318/799, 7, 808, 802, 318/805, 798, 801, 803, 811, 812, 254, 439, 138; 323/210, 211; 219/137.71; 388/815, 822, 908, 909

[56] References Cited

U.S. PATENT DOCUMENTS

| | | | |
|---|---|---|---|
| 3,586,222 | 6/1971 | Rosen | 219/137.71 |
| 4,156,162 | 5/1979 | Warfield et al. | 318/434 |
| 4,756,375 | 7/1988 | Ishikura et al. | 318/139 X |
| 4,786,992 | 11/1988 | Tajima et al. | 318/7 X |
| 4,870,334 | 9/1989 | Iwasa et al. | |
| 5,032,936 | 7/1991 | Fujioka et al. | 318/7 X |
| 5,039,027 | 8/1991 | Yanigihara et al. | 318/7 X |
| 5,053,691 | 10/1991 | Wild et al. | 323/211 |

FOREIGN PATENT DOCUMENTS 259726 8/1988 German Democratic Rep. .
57-65288 4/1982 Japan .

OTHER PUBLICATIONS

F. Fröhr et al., *Einfuhrung in die elektronische Regelungstechnik*, 4th Edition, 1976, Siemens AG, pp. 277-281.

*Primary Examiner*—Jonathan Wysocki
*Attorney, Agent, or Firm*—Antonelli, Terry, Stout & Kraus

[57] ABSTRACT

A speed control method and apparatus for a motor driven by output of a power conversion unit, wherein a first current command value is inputted to derive a drooping variable, a deviation between a detected speed value of the motor and a speed command value is derived, the first current command value is derived on the basis of a value obtained by compensating the deviation with the drooping variable, the speed command value is inputted to derive an acceleration or deceleration current value for accelerating or decelerating the motor, and the first current command value and the acceleration or deceleration current value are added together to derive a second current command value and control the output current of the power conversion unit on the basis of the second current command value.

38 Claims, 9 Drawing Sheets

MOTOR SPEED CONTROL METHOD AND APPARATUS WITH DROOPING COMPENSATION INDEPENDENT OF ACCELERATION OR DECELERATION CURRENT AND TIME CONSTANT OF MOTOR

BACKGROUND OF THE INVENTION

The present invention relates to a motor speed control method and apparatus having a drooping function to effect speed control.

When a material to be rolled is rolled by using a plurality of motors as in a steel rolling line, it is demanded to improve the degree of coincidence of speed (speed matching) or load balance among motors in order to prevent the tension applied to the material to be rolled from changing.

There has been known a system in which speed control apparatuses are provided with drooping functions so that motors may have drooping characteristics to improve speed matching among motors. In conventional drooping characteristics, a drooping variable proportionate to the load current of the motor is derived and subtracted from a speed command value, whereby the motor speed is lowered in proportion to the load current of the motor. At the time of acceleration or deceleration of the motor, however, the drooping variable is derived from not only the load current but also the acceleration or deceleration current. In general, the acceleration or deceleration currents of respective motors differ because of a difference in moment of inertia or the like between motors. Even if drooping characteristics of motors are equally matched, therefore, speed drooping variables of motors differ at the time of acceleration or deceleration. As a result, speed matching of motors is disturbed.

In a known solution to this, the motor current is separated into a load current and an acceleration or deceleration current and the drooping variable (speed drooping variable) is derived from the load current alone. This is described in JP-A-57-65288, for example. Separation into the load current and the acceleration or deceleration current is conventionally conducted by deriving the acceleration or deceleration current from the voltage applied to the motor by means of simulation and subtracting the computed value of the acceleration or deceleration current from the actual value of the motor current.

SUMMARY OF THE INVENTION

Fluctuations in the motor current and the acceleration or deceleration current caused by a fluctuation in voltage applied to the motor depend upon the electric time constant of the motor and become extremely steep. Therefore, the fluctuation included in the drooping variable derived from the load current becomes large. If the fluctuation of the drooping variable is large, the speed command value subjected to drooping compensation also changes greatly. As a result, a fluctuation in voltage applied to the motor is induced.

Thus the drooping function means the speed drooping characteristic, resulting in worsened stability of the speed control system responding to the electric time constant of the motor (which is typically not longer than several tens ms). Further, there is a problem that adjustment of the speed control system becomes extremely difficult.

An object of the present invention is to provide a motor speed control method and apparatus capable of effecting speed control stably even at the time of motor acceleration or deceleration.

Another object of the present invention is to provide a motor speed control method and apparatus having a drooping function and capable of effecting speed control stably.

Still another object of the present invention is to provide a motor speed control apparatus capable of uniquely determining the speed control response when performing speed control.

In accordance with an aspect of the present invention, a motor speed control apparatus is comprised of a motor driven by output of a power conversion unit, a unit for deriving a deviation between a detected speed value of the above described motor and a speed command value and for deriving and outputting a first current command value on the basis of a value obtained by compensating the above described deviation by means of a drooping variable, a unit responsive to the above described speed command value to derive an acceleration or deceleration current value for accelerating or decelerating the above described motor, a unit for adding the above described first current command value and the above described acceleration or deceleration current value to derive a second current command value and for controlling an output current of the above described power conversion unit on the basis of the above described second current command value, and a unit responsive to the above described first current command value to derive the above described drooping variable and output it to the above described unit for outputting the above described first current command value.

In accordance with another aspect of the present invention, a motor speed control apparatus is comprised of a motor driven by output of a power conversion unit, a first order time-lag computing unit for performing first order time-lag computation upon a speed command value and outputting the result, a unit for deriving a deviation between a detected speed value of the above described motor and the above described speed command value subjected to the first order time-lag computation and for deriving and outputting a first current command value on the basis of the above described deviation, a unit responsive to the above described speed command value to derive an acceleration or deceleration current value for accelerating or decelerating the above described motor, and a unit for adding the above described first current command value and the above described acceleration or deceleration current value to derive a second current command value and for controlling an output current of the above described power conversion unit on the basis of the above described second current command value.

That is to say, the present invention comprises the steps of deriving an acceleration or deceleration current value from a speed command value by means of computation, adding the acceleration or deceleration current value to a first current command value (a load current command value) outputted from a speed control unit to produce a second current command value (a motor current command value), deriving a drooping variable from the load current command value, and providing the speed control unit with a value obtained by compensating a deviation between the speed command value and a detected motor speed value with the drooping variable as a command value.

Therefore, the drooping variable is derived with no relation to the electrical time constant of the motor, and a computation time constant for computing the acceleration or deceleration current can be far larger than the electric time constant of the motor. Even if the speed command value largely changes, therefore, the drooping variable does not fluctuate, resulting in improved stability of speed control, facilitated adjustment of the speed control system, and improved speed matching among motors.

Further, the present invention comprises the steps of deriving an acceleration or deceleration current value from a speed command value by means of computation, adding the acceleration or deceleration current value to a first current command value (a load current command value) outputted from a speed control unit to produce a second current command value (a motor current command value), performing first order time-lag computation upon the speed command value and supplying the result to the speed control unit, and thereby compensating the first order time-lag time constant of speed response by a unit for computing the acceleration or deceleration current value.

Thus, the first order time-lag time constant of the acceleration or deceleration current computation is made equivalent to the first order time-lag time constant in performing the first order time-lag compensating computation upon the speed command value, therefore, the load torque current command value, which is outputted by the speed control unit when the speed command value has changed, does not change. As a result, the speed response characteristic with respect to the speed command can be uniquely determined by the acceleration or deceleration current computing unit.

BRIEF DESCRIPTION OF THE DRAWINGS

FIGS. 3A to 3E are time charts showing signal waveforms appearing at various portions of FIG. 1 to describe the operation of the speed control apparatus shown in FIG. 1;

FIGS. 7A to 7F are time charts showing signal waveforms appearing at various portions of FIG. 5 to describe the operation of the speed control apparatus shown in FIG. 5;

DESCRIPTION OF THE PREFERRED EMBODIMENTS

Embodiments of a motor speed control method and apparatus according to the present invention will hereafter be described by referring to accompanying drawings. In drawings, like numerals denote components having the same functions.

Figure 1:
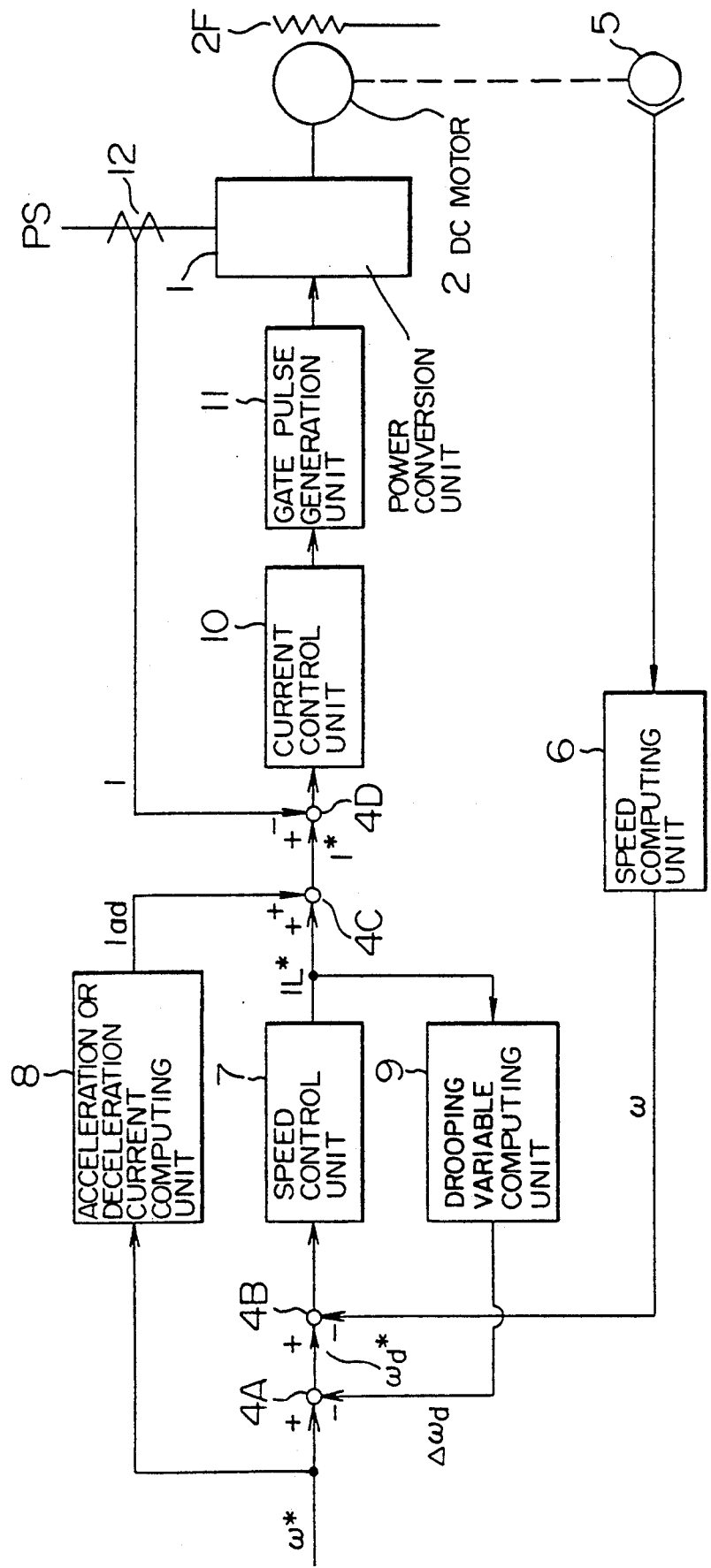
FIG. 1 is a block diagram showing an embodiment of a motor speed control apparatus according to the present invention.

FIG. 1 shows an embodiment of a motor speed control apparatus according to the present invention. FIG. 1 is an example of application of the present invention to a speed control apparatus of a d.c. motor.

With reference to FIG. 1, alternating voltage supplied from an a.c. power supply PS is converted in power to d.c. voltage by a power conversion unit 1, and the resultant d.c. voltage is supplied to a d.c. motor 2. The d.c. motor 2 has a field winding 2F. An armature current supplied to the d.c. motor 2 is detected by a current transformer (current detector) 12. An encoder 5 is directly coupled to the motor mechanically. A speed computing unit 6 detects a motor speed $\omega$ on the basis of pulses generated by the encoder 5. A speed command value $\omega^*$ and a drooping variable $\Delta\omega_d$ are supplied to an adder 4A with illustrated polarities. A speed deviation between a drooping speed command value $\omega_d^*$ and the motor speed $\omega$ detected by the speed computing unit 6 is derived by an adder 4B and inputted to a speed control unit 7. The speed control unit 7 outputs a load torque current command value $I_L^*$ according to the deviation between the speed command value $\omega_d^*$ and the detected speed value $\omega$. The drooping variable computing unit 9 receives the load torque current command value $I_L^*$ and computes the drooping variable $\Delta\omega_d$. On the other hand, an acceleration or deceleration current computing unit 8 receives the speed command value $\omega^*$ and derives an acceleration or deceleration current value $I_{ad}$ by means of computation. The load torque current command value $I_L^*$ and the acceleration or deceleration current value $I_{ad}$ are added together in an adder 4C with illustrated polarities. The output of the adder 4C becomes a current command value $I^*$. A current deviation between the current command value $I^*$ and a detected current value $I$ detected by the current transformer 12 is derived by an adder 4D. A current control unit 10 receives the current deviation derived by the adder 4D, and supplies an ignition control command value to a gate pulse generation unit 11 on the basis of the current deviation. In response to the ignition control command value, the gate pulse generation unit 11 supplies a gate pulse to the power conversion unit 1 to control voltage to be supplied to the d.c. motor 2. The configuration of FIG. 1 has a speed control system as the major loop and has a current control system as the minor loop.

Figure 2:
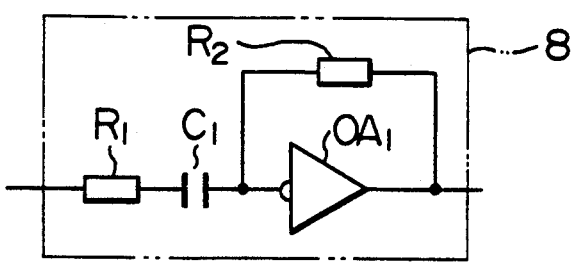
FIG. 2 is a circuit diagram of an acceleration or deceleration current computing unit shown in FIG. 1.

FIG. 2 shows the detailed concrete configuration of the acceleration or deceleration current computing unit 8.

With reference to FIG. 2, the acceleration or deceleration current computing unit 8 comprises a differentiating circuit having a resistor $R_1$ and a capacitor $C_1$ connected in series, an operational amplifier $OA_1$, and a feedback resistor $R_2$.

Operation of the apparatus shown in FIG. 1 will now be described by referring to time charts shown in FIGS. 3A to 3E.

First of all, in such a state that the speed command value $\omega^*$ assumes a constant value and the drooping speed command value $\omega_d^*$ coincides with the detected speed value $\omega$, the speed control unit 7 outputs a load torque current command value $I_L^*$ corresponding to the load torque of the d.c. motor 2. At this time, the drooping variable computing unit 9 is outputting a drooping variable $\Delta\omega_d$ as represented by $$\Delta\omega_d = K \cdot Z \cdot I_L^* \quad (1)$$

where
  $Z$ = drooping variable set point
  $k$ = constant

When the speed command value $\omega^*$ is constant, the acceleration or deceleration current value $I_{ad}$ is zero, and hence the load torque current command $I_L^*$ becomes the current command value $I^*$ and it is compared with a detected current value I by the adder 4D. The current control unit 10 supplies an ignition control command value depending upon the deviation between the current command value $I^*$ and the detected current value I to the gate pulse generation unit 11. On the basis of an ignition control command value, the gate pulse generation unit 11 supplies a gate pulse to the power conversion unit 1 to control the output voltage of the power conversion unit 1. As a result of control of the output voltage of the power conversion unit 1, the speed of the d.c. motor 2 is controlled so as to be proportionate to the drooping speed command value $\omega_d^*$. Such operation is well known and its detailed operation will be omitted.

Figure 3A:
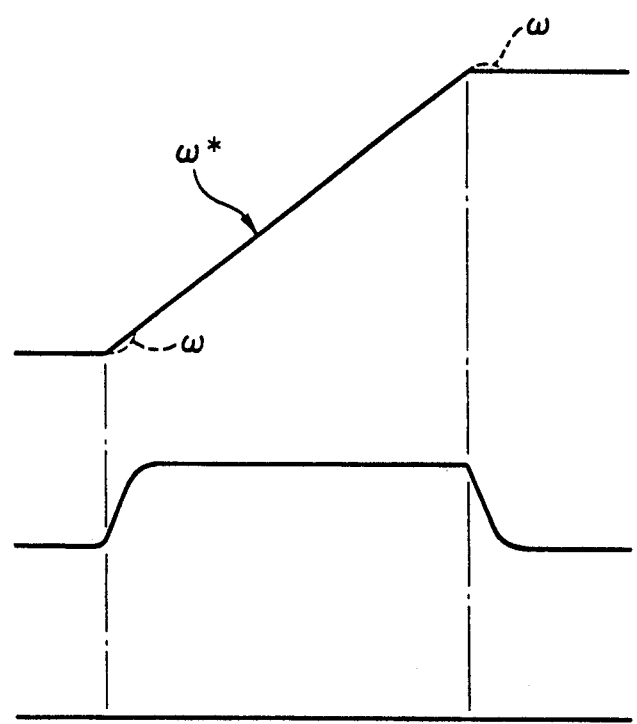

It is now assumed that the speed command value $\omega^*$ is increased in a ramp form as shown in FIG. 3A when the speed of the d.c. motor 2 is so controlled as to be proportionate to the drooping speed command value $\omega_d^*$. At this time, the acceleration or deceleration current computing unit 8 derives the acceleration or deceleration current value $I_{ad}$ by means of computation as described below.

First of all, a current required for the motor speed $\omega$ to respond to the speed command value $\omega^*$ with a first order time-lag time constant $T_1$ is derived.

Figure 4:
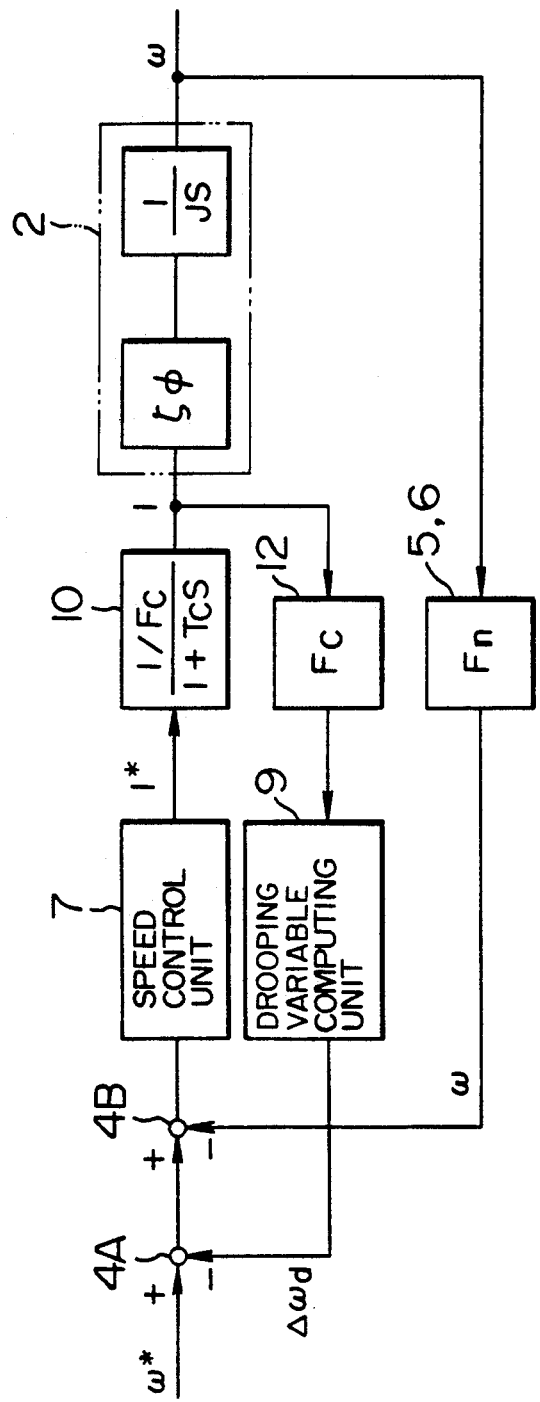
FIG. 4 is a block diagram of transfer functions for explaining the operation of the speed control apparatus according to the present invention.

FIG. 4 is a block diagram of transfer functions required for deriving the relation between the current and speed in the embodiment of FIG. 1. For brevity of description, transfer functions of electric systems of the power conversion unit 1, the gate pulse generation unit 11, and the d.c. motor 2 are omitted.

As evident from FIG. 4, the relation between the motor current I and the motor speed $\omega$ is derived as $$\omega = \frac{\zeta\phi}{J} \cdot \frac{1}{S} \cdot I \quad (2)$$

where
  $\omega$ = motor speed
  I = motor current
  $\zeta\phi$ = torque coefficient
  J = moment of inertia
  S = Laplacian operator Further, the relation between the current I and the current command value $I^*$ can be represented as $$I = \frac{1}{1 + Tc \cdot S} \cdot \frac{1}{Fc} \cdot I^* \quad (3)$$

where
  $I^*$ = motor current command value
  Fc = current detection gain

Tc = response time constant of current control unit 10.

The response time constant Tc of the current control unit 10 is far smaller than the response time constant of the speed control unit 7. Thus neglecting the response time constant Tc of the current control unit 10, equation (3) can be expressed by equation (4).

$$I = \frac{1}{Fc} \cdot I^* \quad (4)$$

The relational equation required for the motor speed $\omega$ to respond to the speed command value $\omega^*$ with the first order time-lag time constant $T_1$ is expressed as $$\omega = \frac{1}{1 + Tc \cdot S} \cdot \frac{1}{Fn} \cdot \omega^* \quad (5)$$

where
  Fn = speed detection gain

Further, the relation between the current command value $I^*$ and the motor speed $\omega$ can be expressed by the following equation on the basis of equations (2) and (4).

$$\omega = \frac{\zeta\phi}{J} \cdot \frac{1}{S} \cdot \frac{1}{Fc} \cdot I^* \quad (6)$$

Therefore, the current command value (acceleration or deceleration current value) $I^*$ required for the motor speed $\omega$ to respond to a change in speed command value $\omega^*$ with the first order time-lag time constant can be expressed by the following equation on the basis of equations (5) and (6).

$$I^* = \frac{J}{\zeta\phi} \cdot S \cdot \frac{Fc}{Fn} \cdot \frac{1}{1 + T_1 S} \cdot \omega^* \quad (7)$$

To facilitate understanding equation (7), $$k_2 = \frac{1}{\zeta\phi} \cdot \frac{Fc}{Fn} \cdot \frac{1}{T_1} \quad (8)$$

equation letting can be expressed by the following equation.

$$I^* = k_2 \frac{T_1 S}{1 + T_1 S} \cdot \omega^* \quad (9)$$

The current command value $I^*$ represented by equation (9) is an acceleration or deceleration current required for acceleration or deceleration of the motor 2. Therefore, the acceleration or deceleration current computing unit 8 receives the speed command value $\omega^*$ and derives the acceleration or deceleration current value $I_{ad}$ given by equation (9).

The acceleration or deceleration current computing unit 8 is configured as shown in FIG. 2, and its transfer function $G_1$ can be represented as $$G_1 = \frac{1}{\frac{1}{C_1 S} + R_1} = \frac{R_2 C_1 S}{1 + R_1 C_1 S} = \frac{R_1 C_1 S}{1 + R_1 C_1 S} \cdot \frac{R_2}{R_1} \quad (10)$$

In equation (10), letting $R_1C_1 = T_n$ (lag time constant) and $R_2/R_1 = k_n$, equation (10) can be represented by the following equation.

$$G_1 = \frac{T_nS}{1 + T_nS} \cdot k_n \quad (11)$$

By choosing the values of the resistor $R_1$ and the capacitor $C_1$ so that the time constant $T_n$ in equation (11) may become equal to the time constant $T_1$ in equation (9), the acceleration or deceleration current value $I_{ad}$ required when the speed command value $\omega^*$ changes can be derived.

If the speed command value $\omega^*$ changes at time $t_1$ in a ramp form as shown in FIG. 3A, the acceleration or deceleration current computing unit 8 outputs the acceleration or deceleration current value $I_{ad}$ as shown in FIG. 3B. The acceleration or deceleration current value $I_{ad}$ is added in the adder 4C to the load torque current command value $I_L^*$ outputted from the speed control unit 7. The resultant current command value $I^*$ as shown in FIG. 3D is applied to the adder 4D. Thereafter, the output voltage of the power conversion unit 1 is controlled as described above to control the motor current I. As a result, the speed $\omega$ of the d.c. motor 2 is controlled so as to coincide with the speed command value $\omega^*$ as represented by a broken line in FIG. 3A. FIG. 3A is shown assuming that the drooping variable $\Delta\omega_d$ is zero. If the acceleration is completed at time $t_2$ and the speed command value $\omega^*$ becomes a constant value, the acceleration or deceleration current value $I_{ad}$ becomes zero with a predetermined time constant and the current command value $I^*$ becomes equivalent to the load torque current command value $I_L^*$. After the time $t_2$, the motor current I is controlled so as to coincide with the load torque current command value $I_L^*$.

Control is effected in this way. The acceleration or deceleration current value is derived from the speed command value $\omega^*$ in a feedforward manner, and the drooping variable is determined by the load torque current command value corresponding to the load torque outputted from the speed control unit 7. Therefore, the drooping variable has no relation to the electric time constant of the motor. Even if the speed command value $\omega^*$ changes greatly, therefore, the drooping variable does not change. As a result, the stability of speed control can be significantly improved. Further, the drooping variable computing unit 9 can be adjusted without paying any regard to the electric time constant of the motor 2, and adjustment of the speed control system being facilitated.

Figure 5:
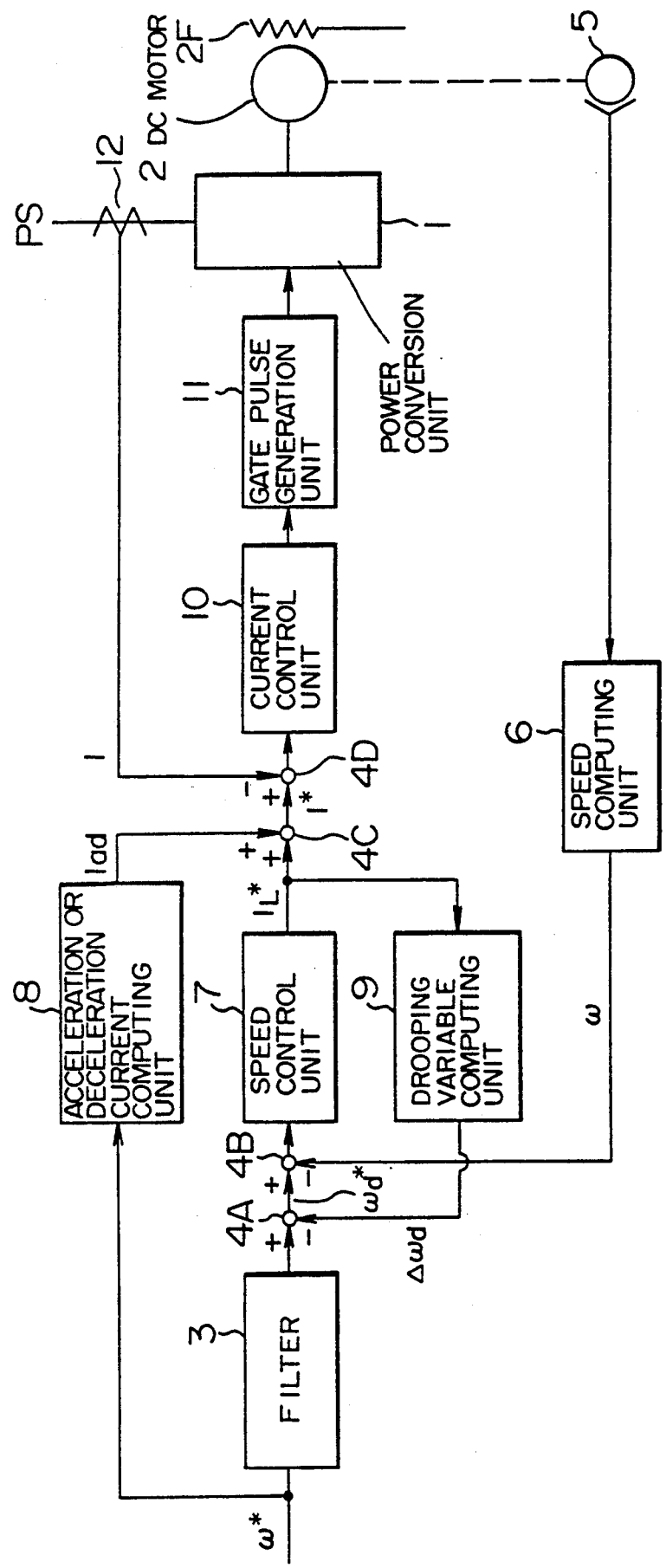
FIG. 5 is a block diagram showing another embodiment of the present invention.

FIG. 5 shows another embodiment of the present invention.

The embodiment shown in FIG. 5 is configured so that occurrence of a dropping variable due to the acceleration or deceleration current may be surely prevented even when the gain of the speed control unit 7 is large.

FIG. 5 differs from FIG. 1 in having a filter 3 for performing first order time-lag computation upon the speed command value $\omega^*$ and applying the result to the adder 4A.

Figure 6:
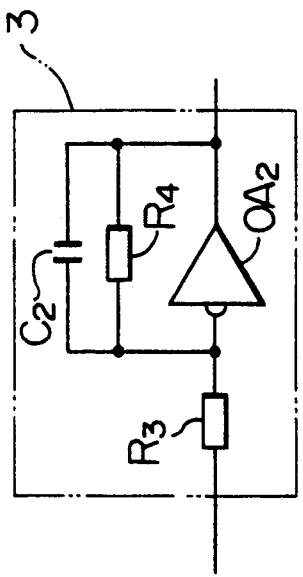
FIG. 6 is a circuit diagram of a filter shown in FIG. 5.

As shown in FIG. 6, the filter 3 comprises an input resistor $R_3$, an operational amplifier $OA_2$, and a feedback circuit having a capacitor $C_2$ and a resistor $R_4$ respectively connected in parallel to the operational amplifier $OA_2$.

Figure 7A:
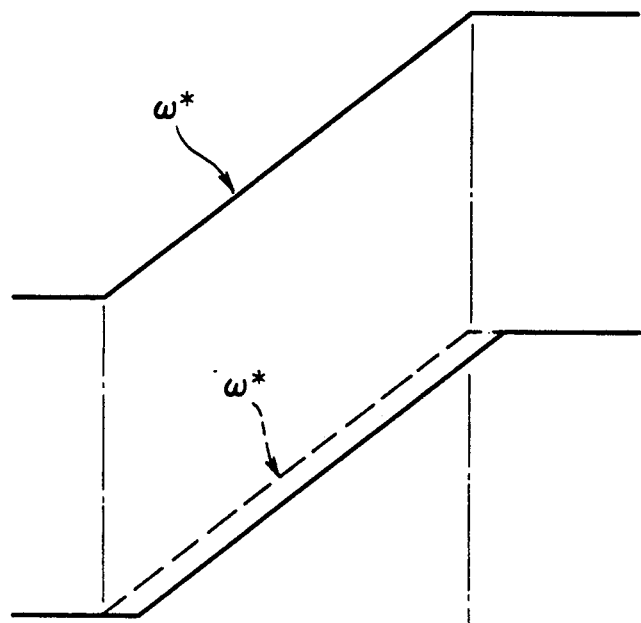
Figure 7B:
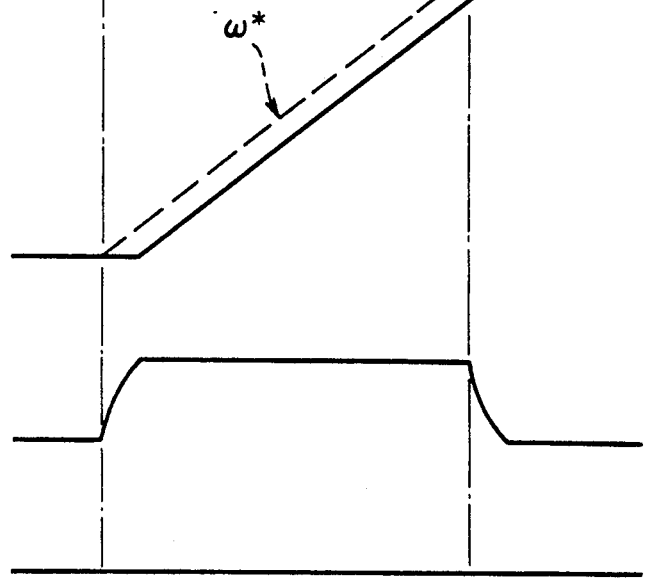

If the gain of the speed control unit 7 is large, the speed change of the d.c. motor 2 lags when the speed command value $\omega^*$ has changed. Therefore, the load torque current command value $I_L^*$ of the speed control unit 7 changes and the drooping variable $\Delta\omega_d$ attempts to change. For example, it is now assumed that the speed command value $\omega^*$ shown in FIG. 7A is changed in a ramp form at time $t_1$. A speed command value, which is the speed command value $\omega^*$ provided with the first order time-lag as shown in FIG. 7B, is outputted from the filter 3. Even if the detected speed value $\omega$ lags, therefore, the output $I_L^*$ of the speed control unit 7 does not change and occurrence of the dropping variable $\Delta\omega_d$ due to the acceleration or deceleration current can be prevented.

By thus providing the embodiment of FIG. 5 with the filter 3, noninterference with respect to the acceleration or deceleration current is attained even when the gain of the speed control unit 7 is large and even when the speed command value $\omega^*$ changes, thereby attaining stable drooping control.

In the embodiment of FIG. 5, the acceleration or deceleration response of the speed $\omega$ with respect to the speed command value $\omega^*$ can be determined uniquely by the acceleration or deceleration current value $I_{ad}$ of the acceleration or deceleration current computing unit 8. This will now be described.

Determination of the acceleration or deceleration response by the lag time constant $T_n$ of the acceleration or deceleration current computing unit 8 can be attained by configuring the apparatus so that the load torque current command value $I_L^*$ may not be changed by the initial value (load current) at the time of acceleration or deceleration. For clarity of description, the load torque current command value $I_L^*$ can be made zero under the condition that the initial value is zero by making the output of the adder 4B equivalent to zero. The output of the adder 4B can be made zero by making the output of the filter 3 equivalent to the detected speed value $\omega$.

The transfer function $G_1$ of the acceleration or deceleration current computing unit 8 is expressed in equation (11) above. A transfer function $G_2$ from the speed command value $\omega^*$ at the time of acceleration or deceleration, i.e., the current command value $I^*$ to the detected speed value $\omega$ can be expressed by the following equation on the basis of FIG. 4.

$$G_2 = \frac{1/Fc}{1 + TcS} \cdot \zeta\phi \cdot \frac{1}{JS} \cdot Fn \quad (12)$$

At the time of acceleration or deceleration, the transfer function from the speed command value $\omega^*$ to the detected speed value $\omega$ can be expressed by the following equation.

$$G_1G_2 = \frac{T_nS}{1 + T_nS} \cdot k_n \cdot \frac{1/Fc}{1 + TcS} \cdot \zeta\phi \cdot \frac{1}{JS} \cdot Fn \quad (13)$$

In equation (13) letting $$k_3 = T_nk_n \cdot \frac{\zeta\phi}{FcJ} \cdot Fn \quad (14)$$

and designing the apparatus so that $k_3 = 1$, equation (13) can be rewritten as $$G_1G_2 = \frac{1}{1 + T_nS} \cdot \frac{1}{1 + TcS} \quad (15)$$

In equation (15), the lag time constant $T_c$ of the current control unit 10 is far smaller than the time constant $T_n$. Thus neglecting $T_c$, the response time constant of the transfer function $G_1 G_2$ is determined by the lag time constant $T_n$ of the acceleration/deceleration current computing unit 8.

On the other hand, transfer function $G_3$ of the filter 3 can be derived from FIG. 6 as $$G_3 = \frac{\frac{1}{\frac{1}{R_4} + C_2 S}}{R_3} = \frac{\frac{R_4}{1 + R_4 C_2 S}}{R_3} \quad (16)$$

$$= \frac{1}{1 + R_4 C_2 S} \cdot \frac{R_4}{R_3} = \frac{1}{1 + T_f S} \cdot k_4$$

$R_4 R_2$ in the transfer function $G_3$ of the filter 3 expressed by equation (16) is a lag time constant $T_f$. Values of the resistor $R_4$ and the capacitor $C_2$ are determined so that this lag time constant $T_f$ may become equivalent to the lag time constant $T_n$ of the acceleration or deceleration current computing unit 8.

If the lag time constant $T_f$ of the filter 3 is thus made equivalent to the lag time constant $T_n$ of the acceleration or deceleration current computing unit 8, the response of the speed command value $\omega_d^*$ to the speed command value $\omega^*$ becomes equivalent to the response of the detected speed value $\omega$ to the speed command value $\omega^*$. Therefore, the speed response can be determined uniquely by the acceleration or deceleration current computing unit 8.

If the time constant $R_3 C_2$ of the filter 3 is made equivalent to the time constant $T_n$ of the acceleration or deceleration current computing unit 8, the response of the detected speed value $\omega$ to the speed command value $\omega^*$ and the response of the output of the filter 3 to the speed command value $\omega^*$ become the time constant $T_n$. That is to say, both responses become equivalent. At the time of acceleration or deceleration as well, therefore, the current command value $I_L^*$ becomes the load current alone. As a result, the speed response can be uniquely determined by the acceleration or deceleration current computing unit 8. The drooping variable, i.e., the speed change value with respect to the speed command value obtained when the motor is running at the rated load and at the rated speed is typically 0.2 to 10%. It is desired that this value is as small as possible. Therefore, improved responsiveness at the time of speed change and stable speed control may be attained by making the value of Z in equation (1) equivalent to substantially zero to make the drooping variable $\Delta \omega_d$ substantially zero, supplying the deviation between the result of the first order time-lag computation performed upon the speed command value and the detected speed value to the speed control unit 7, and making the lag time constant $T_f$ of the filter 3 equivalent to the lag time constant of the acceleration or deceleration current computing unit 8.

Figure 8:
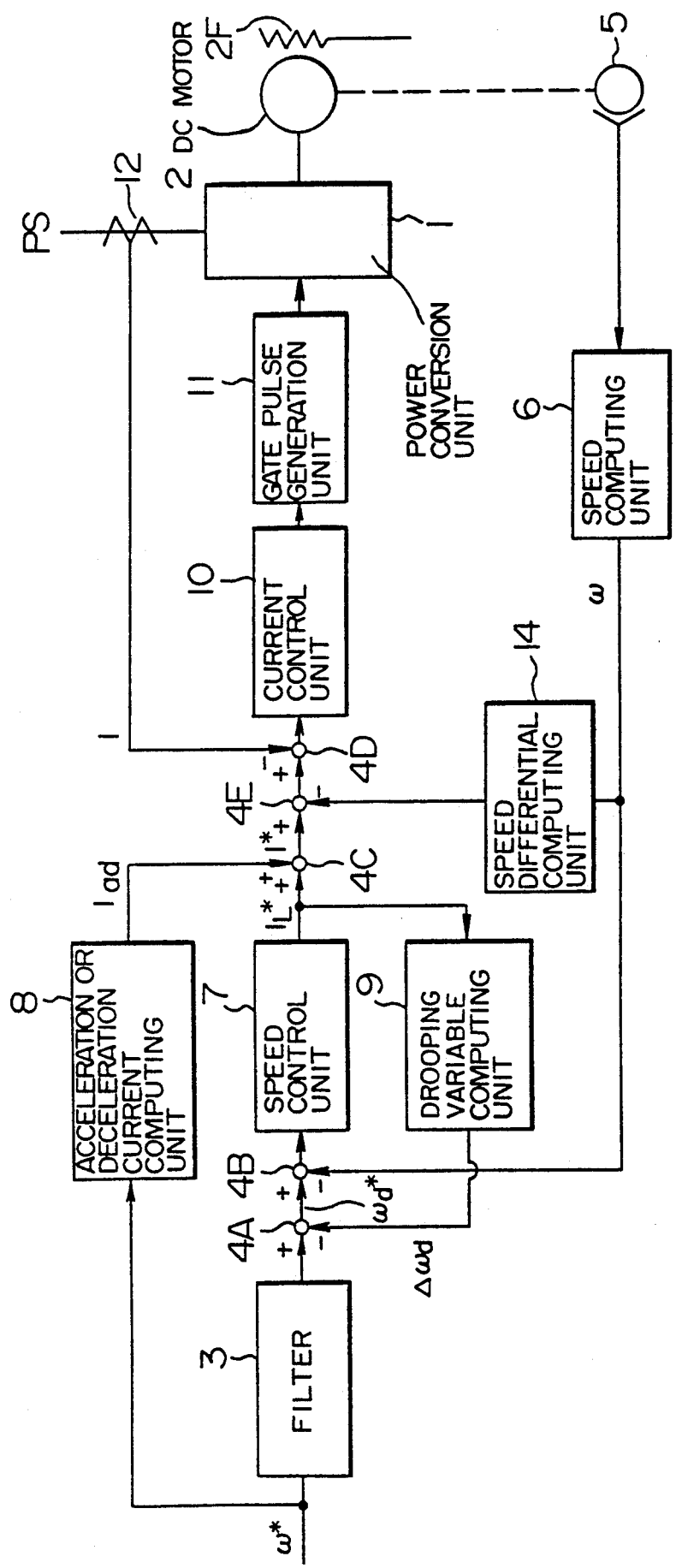
FIG. 8 is a block diagram showing another embodiment of the present invention.

FIG. 8 shows another embodiment of the present invention.

The embodiment of FIG. 8 is obtained by adding a speed differential computing unit 14 and an adder 4E to the embodiment of FIG. 5.

In FIG. 8, the detected speed value $\omega$ detected by the speed computing unit 6 is differentiated by the speed differential computing unit 14 and the resultant speed differential value is applied to the adder 4E with the illustrated polarity. The adder 4E subtracts the speed differential value from the current command value I* and applies the resultant difference to the adder 4D. Based on the current command value I* minus the speed differential value as the desired current value, the current control unit 10 controls the current to be supplied to the motor 2.

In such control, the speed differential value is fed back. Without relying upon the operation of the speed control unit 7 having a large time constant, therefore, the current command from the speed differential computing unit 14 can be obtained, and hence the speed control response can be improved. As a result, the drooping control can be performed effectively.

It is a matter of course that similar effects can be obtained by adding the speed differential computing unit 14 and the adder 4E to the embodiment shown in FIG. 1.

Figure 9:
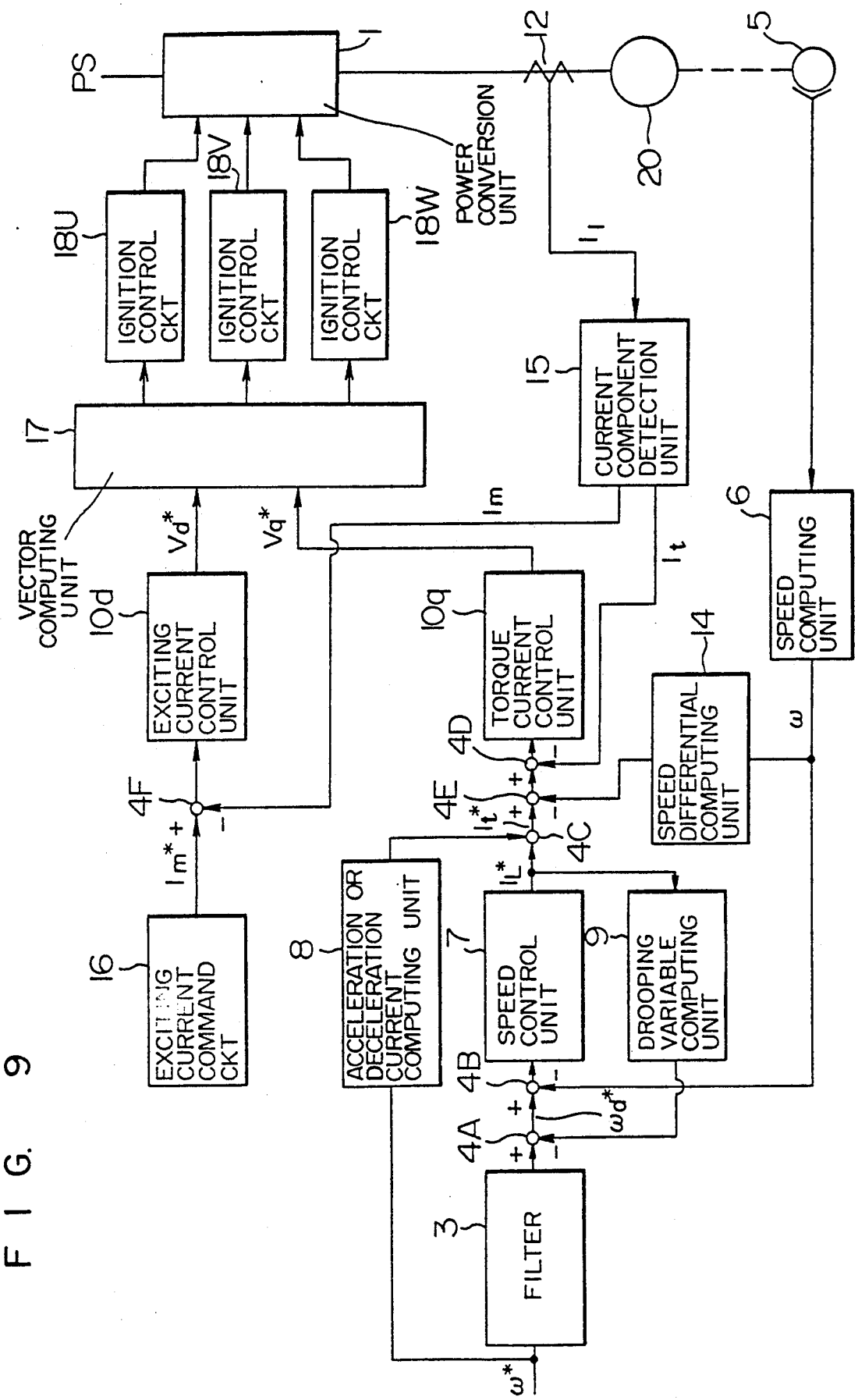
FIG. 9 is a block diagram of an embodiment in which the present invention is applied to an apparatus for effecting vector control upon an induction motor.

FIG. 9 shows another embodiment of the present invention.

FIG. 9 shows an embodiment in which the present invention is applied to a system for exercising vector control upon an induction motor.

In FIG. 9, the same characters as those of FIG. 5 denote like components. With reference to FIG. 9, the primary current $I_l$ of the induction motor 20 detected by the current transformer 12 is inputted to a current component detection unit 15. The current component detection unit 15 detects the torque current component $I_t$ and the exciting current component $I_m$ of the primary current $I_l$. The torque current component $I_t$ is applied to the adder 4D, and the exciting current component $I_m$ is applied to an adder 4F. The adder 4D adds a torque current component command value $I_t^*$ outputted from the adder 4C and the detected torque current value $I_t$ with illustrated polarities, and supplies the resultant deviation to a torque current control unit (q-axis current control unit) 10q. The torque current control unit 10q generates a q-axis voltage command value $V_q^*$ depending upon the torque current deviation and supplies it to a vector computing unit 17. On the other hand, the adder 4F adds an exciting current component command value $I_m^*$ outputted from an exciting current command circuit 16 and the detected exciting current value $I_m$ with illustrated polarities, and supplies the resultant deviation to an exciting current control unit (d-axis current control unit) 10d. The exciting current control unit 10d generates a d-axis voltage command value $V_d^*$ depending upon the exciting current deviation and inputs it to the vector computing unit 17. The vector computing unit 17 receives the q-axis voltage command value $V_q^*$ and the d-axis voltage command value $V_d^*$, derives voltage command values of respective phases by means of computation, and supplies them to ignition control circuits 18U, 18V and 18W of respective phases. A circuit for exercising pulse duration modulation, for example, is used as the ignition control circuit. The ignition control circuits 18U, 18V and 18W control the power conversion unit 1 to control the primary current of the induction motor 20.

By the vector control in this configuration, the magnitude, frequency and phase of the primary current $I_l$ of the induction motor 20 are controlled, thereby the torque current $I_t$ and the exciting current $I_m$ being controlled independently.

Since vector control performed by controlling the power conversion unit 1 in an armature-voltage control form as in the example of FIG. 9 is well known, its description will be omitted.

In the embodiment of FIG. 9 as well, the torque current control system (speed control system) comprises the acceleration or deceleration current computing unit 8, the drooping variable computing unit 9, and the filter 3. Therefore, the drooping variable is not changed by the acceleration or deceleration current and the stability of speed control using vector control can be significantly improved.

In the embodiment of FIG. 9, vector control is performed by controlling the power conversion unit in an armature-voltage control form. However, it is a matter of course that the present invention can be employed in the same way even for vector control performed by controlling the power conversion unit in an armature-current control form.

In each of the above described embodiments, positions of the adders 4A and 4B may be interchanged. Further, in each of the embodiments of FIGS. 1 and 5, positions of the adders 4C and 4D are interchanged. In each of the embodiments of FIGS. 8 and 9, the order of adders 4C, 4D and 4E may be arbitrarily selected.

In the configuration of each of the above described embodiments, control is performed by analog signals. However, the above described embodiments can be similarly practiced even in a configuration using a microprocessor to implement digital control.

Figure 10:
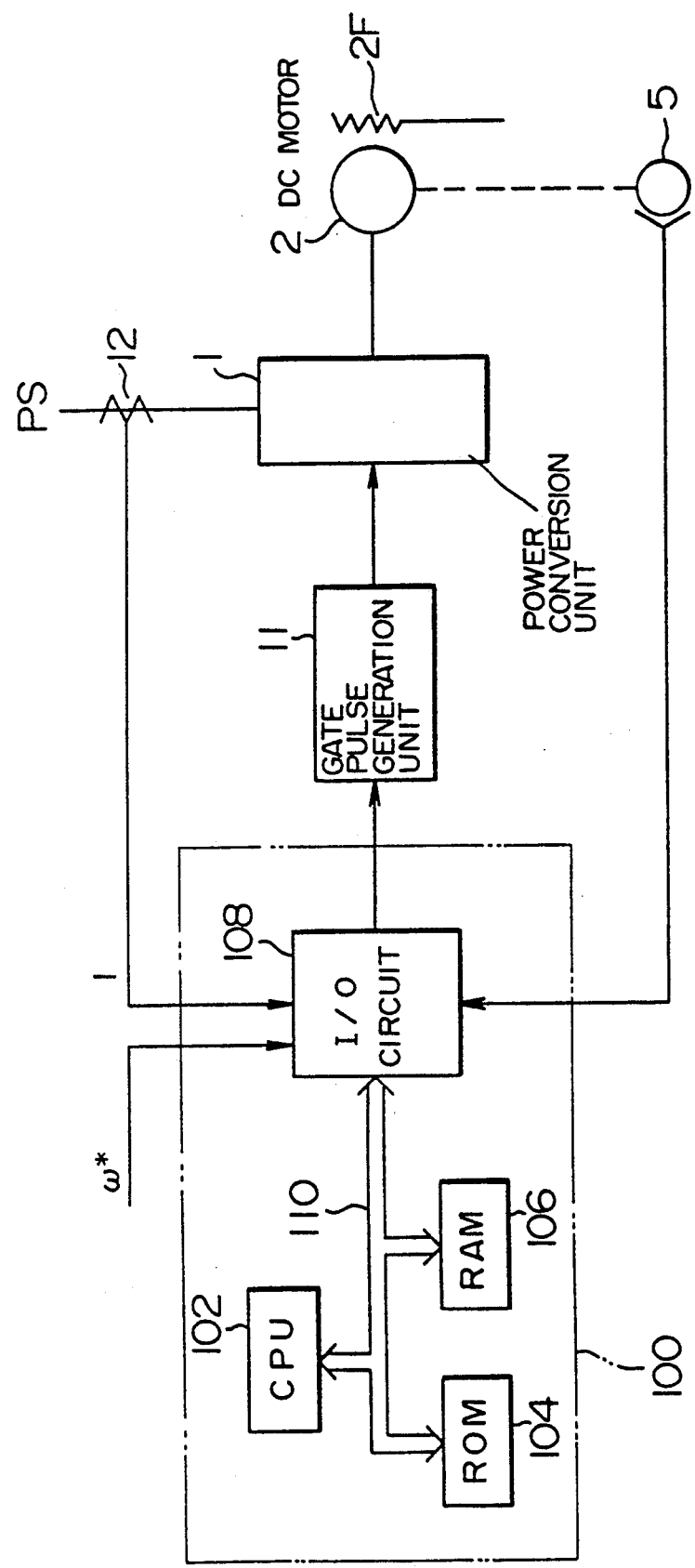
FIG. 10 is a block diagram of an embodiment in which the speed control apparatus of FIG. 1 is implemented by digital control.

For example, the configuration of an embodiment equivalent to the embodiment of FIG. 1 excepting that digital control is implemented is shown in FIG. 10. A flow chart of its operation is shown in FIG. 11.

With reference to FIG. 10, a control unit 100 comprises a central processing unit (CPU) 102, a read-only memory (ROM) 104, a random access memory (RAM) 106, an input-output (I/O) circuit 108, and a bus 110. The control unit 100 has the function of the adders 4A to 4D, the speed computing unit 6, the speed control unit 7, the acceleration or deceleration current computing unit 8, the drooping variable control unit 9, and the current control unit 10 shown in FIG. 1. The armature current I fed from the current transformer 12, the speed command value $\omega^*$, and pulses fed from the encoder 5 are inputted to the I/O circuit 108. The I/O circuit 108 supplies an ignition control command value calculated on the basis of these inputs to the gate pulse generation unit 11.

Figure 11:
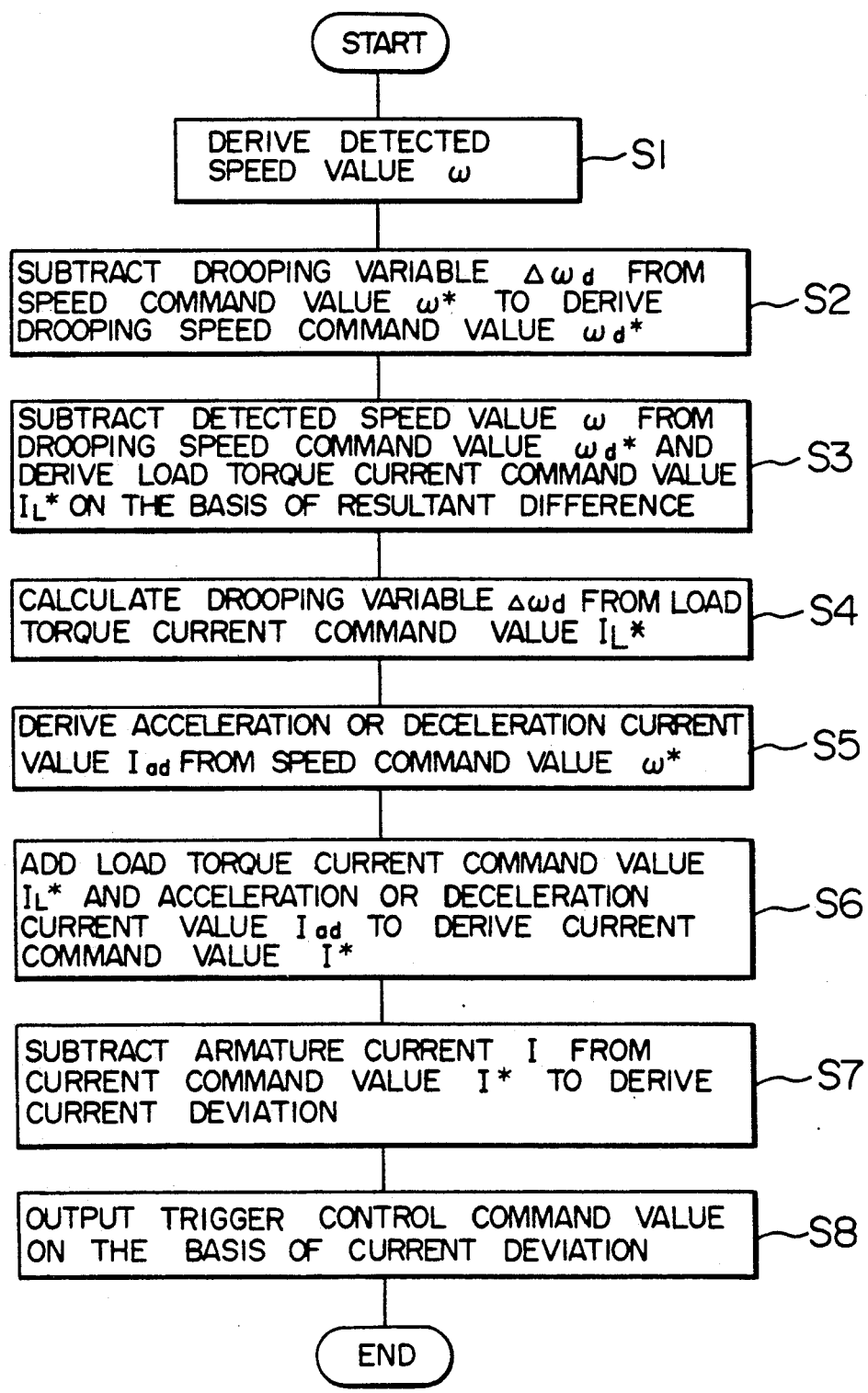
FIG. 11 is a flow chart for describing the operation of the speed control apparatus of FIG. 10.

Operation of the control unit 100 will hereafter be described by referring to the flow chart of FIG. 11.

First of all, the motor speed is calculated on the basis of the pulses fed from the encoder 5 and its value $\omega$ is stored in the RAM (step S1). Then the drooping variable $\Delta\omega_d$ stored in the RAM is subtracted from the speed command value $\omega^*$ to derive the drooping speed command value $\omega_d^*$ (step S2). The detected speed value $\omega$ stored in the RAM is subtracted from the command value $\omega_d^*$ thus derived, and the load torque current command value $I_L^*$ is derived on the basis of the resultant difference (step S3). The drooping variable $\Delta\omega_d$ is derived on the basis of the current command value $I_L^*$, and it is used to rewrite the previous drooping variable stored in the RAM (step S4). The acceleration or deceleration current $I_{ad}$ is derived from the speed command value $\omega^*$ (step S5). The load torque current command value $I_L^*$ and the above described acceleration or deceleration current value $I_{ad}$ are added together to derive the current command value $I^*$ (step S6). The armature current I is subtracted from the above described current command value $I^*$ to derive the current deviation (step S7). The trigger control command value is derived from the current deviation and is outputted to the gate pulse generation unit 11 (step S8).

Calculation methods (equations) for deriving respective values described above are identical with those of the embodiment of FIG. 1.

The above described operation flow is an example, and various alterations of the procedure are possible. For example, in an alternate procedure, the detected speed value $\omega$ is subtracted from the speed command value $\omega^*$, and on the basis of a value obtained by further substracting the drooping variable $\Delta\omega_d$ from the resultan difference, the load torque current command value $I_L^*$ is calculated.

Digital control can also be applied to each of embodiments of FIGS. 5, 8 and 9 by using a similar method.

In the present invention, the drooping variable is derived irrespective of the electric time constant of the motor as heretofore described. Even if the speed command value largely changes, therefore, the drooping variable does not fluctuate, resulting in improved stability of speed control.

Further, the speed command value is delayed by the lag time constant of the acceleration or deceleration current computation before it is supplied to the speed control unit.

Even if the gain of the speed control unit is high, therefore, the drooping variable is not changed by the acceleration or deceleration current. Also, the speed response characteristic can be uniquely determined by the acceleration or deceleration current computing unit.

We claim:

1. A motor speed control apparatus comprising:
   a motor;
   a power conversion unit for supplying current to the motor to drive the motor;
   detecting means for detecting a speed of the motor;
   first deriving means for deriving a first current command value for driving the motor at a constant speed based on at least the detected speed of the motor and a speed command value representing a desired speed of the motor;
   second deriving means for deriving an acceleration or deceleration current value for accelerating or decelerating the motor based on the speed command value;
   third deriving means for deriving a second current command value based on at least a sum of the first current command value and the acceleration or deceleration current value; and
   controlling means for controlling the power conversion unit to control the current supplied to the motor based on at least the second current command value.

2. A motor speed control apparatus according to claim 1, further comprising:
   fourth deriving means for deriving a drooping variable based on the first current command value and supplying the drooping variable to the first deriving means;
   wherein the first deriving means includes
      subtracting means for subtracting the detected speed of the motor and the drooping variable from the speed command value to obtain a speed deviation, and
      means for deriving the first current command value based on the speed deviation.

3. A motor speed control apparatus according to claim 2, wherein the subtracting means includes
   means for subtracting the detected speed of the motor from the speed command value to obtain a difference value, and
   means for subtracting the drooping variable from the difference value to obtain the speed deviation.

4. A motor speed control apparatus according to claim 3, wherein
   the first current command value is independent of a time constant of the motor; and
   the second deriving means derives the acceleration or deceleration current value when the speed command value changes.

5. A motor speed control apparatus according to claim 4, wherein the first current command value is independent of an electric time constant of the motor even when the speed command value changes.

6. A motor speed control apparatus according to claim 3, wherein
   the detecting means, the first deriving means, the second deriving means, the third deriving means, and the fourth deriving means constitute a speed control system of the motor speed control apparatus; and
   the controlling means constitutes a current control system of the motor speed control apparatus.

7. A motor speed control apparatus according to claim 3, further comprising:
   differentiating means for differentiating the detected speed of the motor to obtain a speed differential value;
   wherein the third deriving means includes
      means for adding the first current command value to the acceleration or deceleration current value to obtain the sum of the first current command value and the acceleration or deceleration current value, and
      means for subtracting the speed differential value from the sum to obtain the second current command value.

8. A motor speed control apparatus according to claim 7, wherein
   the motor is an induction motor;
   the first current command value is independent of an electric time constant of the induction motor even when the speed command value changes;
   the second current command value derived by the third deriving means is a torque current component command value for controlling a torque component of the current supplied to the induction motor; and
   the controlling means includes
      means for generating an exciting current component command value for controlling an exciting component of the current supplied to the induction motor, and
      vector controlling means for vector controlling the power conversion unit to control the torque component and the exciting component of the current supplied to the motor based on the torque current component command value and the exciting current component command value.

9. A motor speed control apparatus according to claim 3, wherein
   the motor is an induction motor;
   the second current command value derived by the third deriving means is a torque current component command value for controlling a torque component of the current supplied to the induction motor; and
   the controlling means includes
      means for generating an exciting current component command value for controlling an exciting component of the current supplied to the induction motor, and
      vector controlling means for vector controlling the power conversion unit to control the torque component and the exciting component of the current supplied to the motor based on the torque current component command value and the exciting current component command value.

10. A motor speed control apparatus according to claim 9, wherein the vector controlling means includes
    q-axis current control means for deriving a q-axis voltage command value based on the torque current component command value,
    d-axis current control means for deriving a d-axis voltage command value based on the exciting current component command value, and
    vector computing means for performing vector control of the power conversion unit to control the torque component and the exciting component of the current supplied to the motor based on the q-axis voltage command value and the d-axis voltage command value.

11. A motor speed control apparatus according to claim 2, wherein the subtracting means includes
    means for subtracting the drooping variable from the speed command value to obtain a difference value, and
    means for subtracting the detected speed of the motor from the difference value to obtain the speed deviation.

12. A motor speed control apparatus according to claim 11, wherein
    the first current command value is independent of an electric time constant of the motor even when the speed command value changes;
    the detecting means, the first deriving means, the second deriving means, the third deriving means, and the fourth deriving means constitute a speed control system of the motor speed control apparatus; and
    the controlling means constitutes a current control system of the motor speed control apparatus.

13. A motor speed control apparatus according to claim 2, wherein
    the motor is an induction motor;
    the second current command value derived by the third deriving means is a torque current component command value for controlling a torque component of the current supplied to the induction motor; and
    the controlling means includes
       means for generating an exciting current component command value for controlling an exciting component of the current supplied to the induction motor, and
       vector controlling means for vector controlling the power conversion unit to control the torque component and the exciting component of the current supplied to the motor based on the torque current component command value and the exciting current component command value.

14. A motor speed control apparatus according to claim 1, wherein the first deriving means includes
first-order time-lag computing means for performing first-order time-lag computation on the speed command value to obtain a modified speed command value,
means for subtracting the detected speed of the motor from the modified speed command value to obtain a speed deviation, and
means for deriving the first current command value based on the speed deviation.

15. A motor speed control apparatus according to claim 14, wherein the first-order time-lag computing means includes a filter.

16. A motor speed control apparatus according to claim 14, wherein
the first-order time-lag computing means has a first-order time-lag constant; and
the second deriving means has a first-order time-lag constant equivalent to the first-order time-lag constant of the first-order time-lag computing means.

17. A motor speed control apparatus according to claim 14, wherein
the first-order time-lag computing means enables the first deriving means to derive the first current command value even when the speed command value changes; and
the second deriving means derives the acceleration or deceleration current value when the speed command value changes.

18. A motor speed control apparatus according to claim 17, wherein the first-order time-lag computing means includes a filter.

19. A motor speed control apparatus according to claim 14, wherein
the first-order time-lag computing means prevents the first current command value from changing when the speed command value changes; and
the second deriving means derives the acceleration or deceleration current value when the speed command value changes.

20. A motor speed control apparatus according to claim 19, wherein the first-order time-lag computing means includes a filter.

21. A motor speed control apparatus according to claim 1, further comprising:
fourth deriving means for deriving a drooping variable based on the first current command value and supplying the dropping variable to the first deriving means;
wherein the first deriving means includes
first-order time-lag computing means for performing first-order time-lag computation on the speed command value to obtain a modified speed command value,
subtracting means for subtracting the detected speed of the motor and the drooping variable from the modified speed command value to obtain a speed deviation, and
means for deriving the first current command value based on the speed deviation.

22. A motor speed control apparatus according to claim 21, wherein the subtracting means includes
means for subtracting the detected speed of the motor from the modified speed command value to obtain a difference value, and
means for subtracting the drooping variable from the difference value to obtain the speed deviation.

23. A motor speed control apparatus according to claim 22, wherein
the first-order time-lag computing means prevents the first current command value from changing when the speed command value changes;
the first current command value is independent of an electric time constant of the motor even when the speed command value changes; and
the second deriving means derives the acceleration or deceleration current value when the speed command value changes.

24. A motor speed control apparatus according to claim 23, further comprising:
differentiating means for differentiating the detected speed of the motor to obtain a speed differential value;
wherein the third deriving means includes
means for adding the first current command value to the acceleration or deceleration current value to obtain the sum of the first current command value and the acceleration or deceleration current value, and
means for subtracting the speed differential value from the sum to obtain the second current command value.

25. A motor speed control apparatus according to claim 22, wherein
the first-order time-lag computing means enables the first deriving means to derive the first current command value even when the speed command value changes; and
the first current command value is independent of an electric time constant of the motor even when the speed command value changes; and
the second deriving means derives the acceleration or deceleration current value when the speed command value changes.

26. A motor speed control apparatus according to claim 22, wherein
the motor is an induction motor;
the first-order time-lag computing means prevents the first current command value from changing when the speed command value changes;
the first current command value is independent of an electric time constant of the induction motor even when the speed command value changes;
the second current command value derived by the third deriving means is a torque current component command value for controlling a torque component of the current supplied to the induction motor; and
the controlling means includes
means for generating an exciting current component command value for controlling an exciting component of the current supplied to the induction motor, and
vector controlling means for vector controlling the power conversion unit to control the torque component and the exciting component of the current supplied to the motor based on the torque current component command value and the exciting current component command value.

27. A motor speed control apparatus according to claim 22, further comprising:
differentiating means for differentiating the detected speed of the motor to obtain a speed differential value;
wherein the motor is an induction motor;

the first-order time-lag computing means prevents the first current command value from changing when the speed command value changes;

the first current command value is independent of an electric time constant of the induction motor even when the speed command value changes;

the third deriving means includes means for adding the first current command value to the acceleration or deceleration current value to obtain the sum of the first current command value and the acceleration or deceleration current value, and means for subtracting the speed differential value from the sum to obtain the second current command value;

the second current command value derived by the third deriving means is a torque current component command value for controlling a torque component of the current supplied to the induction motor; and the controlling means includes means for generating an exciting current component command value for controlling an exciting component of the current supplied to the induction motor, and vector controlling means for vector controlling the power conversion unit to control the torque component and the exciting component of the current supplied to the motor based on the torque current component command value and the exciting current component command value.

28. A motor speed control method for controlling a speed of a motor driven by current supplied from a power conversion unit, the method comprising the steps of:

(a) detecting a speed of the motor;

(b) deriving a first current command value for driving the motor at a constant speed based on at least the detected speed of the motor and a speed command value representing a desired speed of the motor;

(c) deriving an acceleration or deceleration current value for accelerating or decelerating the motor based on the speed command value;

(d) deriving a second current command value based on at least a sum of the first current command value and the acceleration or deceleration current value; and (e) controlling the power conversion unit to control the current supplied to the motor based on at least the second current command value.

29. A motor speed control method according to claim 28, further comprising the step of:

deriving a drooping variable based on the first current command value;

wherein the step (b) includes the substeps of (b1) subtracting the detected speed of the motor and the drooping variable from the speed command value to obtain a speed deviation, and (b2) deriving the first current command value based on the speed deviation.

30. A motor speed control method according to claim 29, wherein the substep (b1) includes the substeps of (b11) subtracting the detected speed of the motor from the speed command value to obtain a difference value, and (b12) subtracting the drooping variable from the difference value to obtain the speed deviation.

31. A motor speed control method according to claim 30, further comprising the step of:

differentiating the detected speed of the motor to obtain a speed differential value;

wherein the step (d) includes the substeps of (d1) adding the first current command value to the acceleration or deceleration current value to obtain the sum of the first current command value and the acceleration or deceleration current value, and (d2) subtracting the speed differential value from the sum to obtain the second current command value.

32. A motor speed control method according to claim 31, wherein the motor is an induction motor;

the second current command value derived in the step (d) is a torque current component command value for controlling a torque component of the current supplied to the induction motor; and the step (e) includes the substeps of (e1) generating an exciting current component command value for controlling an exciting component of the current supplied to the induction motor, and (e2) vector controlling the power conversion unit to control the torque component and the exciting component of the current supplied to the motor based on the torque current component command value and the exciting current component command value.

33. A motor speed control method according to claim 30, wherein the motor is an induction motor;

the second current command value derived in the step (d) is a torque current component command value for controlling a torque component of the current supplied to the induction motor; and the step (e) includes the substeps of (e1) generating an exciting current component command value for controlling an exciting component of the current supplied to the induction motor, and (e2) vector controlling the power conversion unit to control the torque component and the exciting component of the current supplied to the motor based on the torque current component command value and the exciting current component command value.

34. A motor speed control method according to claim 28, wherein the step (b) includes the substeps of (b1) performing first-order time-lag computation on the speed command value to obtain a modified speed command value, (b12) subtracting the detected speed of the motor from the modified speed command value to obtain a speed deviation, and (b13) deriving the first current command value based on the speed deviation.

35. A motor speed control method according to claim 34, wherein the first-order time-lag computation in the substep (b1) is performed based on a first-order time-lag constant; and the step (c) of deriving the acceleration or deceleration current value is performed based on a first-order time-lag constant equivalent to the first-order time-lag constant in the substep (b1).

36. A motor speed control method according to claim 34, further comprising the step of:

differentiating the detected speed of the motor to obtain a speed differential value;

wherein the first-order time-lag computation performed in the substep (b1) prevents the first current command value from changing when the speed command value changes; and the step (d) includes the substeps of
- (d1) adding the first current command value to the acceleration or deceleration current value to obtain the sum of the first current command value and the acceleration or deceleration current value, and
- (b2) subtracting the speed differential value from the sum to obtain the second current command value.

37. A motor speed control method according to claim 28, further comprising the step of:

deriving a drooping variable based on the first current command value;

wherein the step (b) includes the substeps of
- (b1) performing first-order time-lag computation on the speed command value to obtain a modified speed command value,
- (b2) subtracting the detected speed of the motor and the drooping variable from the modified speed command value to obtain a speed deviation, and
- (b3) deriving the first current command value based on the speed deviation.

38. A motor speed control method according to claim 37, wherein the motor is an induction motor;

the first-order time-lag computation performed in the substep (b1) prevents the first current command value from changing when the speed command value changes;

the second current command value derived in the step (d) is a torque current component command value for controlling a torque component of the current supplied to the induction motor; and the step (e) includes the substeps of
- (e1) generating an exciting current component command value for controlling an exciting component of the current supplied to the induction motor, and
- (e2) vector controlling the power conversion unit to control the torque component and the exciting component of the current supplied to the motor based on the torque current component command value and the exciting current component command value.

* * * * *